United States Patent
Ren et al.

(10) Patent No.: US 9,525,740 B2
(45) Date of Patent: Dec. 20, 2016

(54) ACCESSING A PRIVATE NETWORK THROUGH L2TP

(75) Inventors: Junfeng Ren, Beijing (CN); Di Zhou, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 213 days.

(21) Appl. No.: 13/981,072

(22) PCT Filed: Dec. 8, 2011

(86) PCT No.: PCT/CN2011/083702
§ 371 (c)(1),
(2), (4) Date: Jul. 22, 2013

(87) PCT Pub. No.: WO2012/126262
PCT Pub. Date: Sep. 27, 2012

(65) Prior Publication Data
US 2013/0346623 A1 Dec. 26, 2013

(30) Foreign Application Priority Data
Mar. 18, 2011 (CN) .......................... 2011 1 0066594

(51) Int. Cl.
G06F 15/16 (2006.01)
G06F 15/173 (2006.01)
(Continued)

(52) U.S. Cl.
CPC ........... H04L 67/14 (2013.01); H04L 12/4633 (2013.01); H04L 41/0806 (2013.01);
(Continued)

(58) Field of Classification Search
CPC .. H04L 67/14; H04L 12/4633; H04L 12/4641;
H04L 61/2038; H04L 61/2514; H04L 63/0272; H04L 63/104; H04L 63/162; H04L 63/306; H04L 69/16; H04L 69/168; H04L 69/328
(Continued)

(56) References Cited

U.S. PATENT DOCUMENTS

2003/0039237 A1  2/2003 Forslow
2004/0103205 A1* 5/2004 Larson et al. ................ 709/229
(Continued)

FOREIGN PATENT DOCUMENTS

CN    1728681    2/2006
CN    1863155    11/2006
(Continued)

OTHER PUBLICATIONS

"IT168 Feature Article", Jan. 5, 2010, claims 1-10, pp. 3-9.
(Continued)

*Primary Examiner* — Farzana Huq
(74) *Attorney, Agent, or Firm* — Hewlett Packard Enterprise Patent Department (57) ABSTRACT

According to an example, to access a network through a Layer 2 Tunnel Protocol (L2TP) includes assigning a private network IP address to a public network user device, and transmitting a route of a surveillance segment to the public network user device, such that, after the route of the surveillance segment is received by the public network user device, an IP address of the L2TP virtual interface of the public network user device is configured as a next-hop of the route. When an access request to a surveillance device in the private network is initiated, a routing table of the public network user device is searched to find a matching route of the surveillance segment according to an IP address of the surveillance device. The access request is transmitted to an
(Continued)

L2TP server through the L2TP virtual interface, and forwarded to the surveillance device.

10 Claims, 5 Drawing Sheets

(51) Int. Cl.
| | |
|---|---|
| *H04B 7/14* | (2006.01) |
| *H04W 4/00* | (2009.01) |
| *H04L 12/66* | (2006.01) |
| *H04J 3/22* | (2006.01) |
| *H04L 29/08* | (2006.01) |
| *H04L 12/46* | (2006.01) |
| *H04L 12/24* | (2006.01) |
| *H04L 29/12* | (2006.01) |
| *H04L 29/06* | (2006.01) |

(52) U.S. Cl.
CPC ...... *H04L 61/2038* (2013.01); *H04L 63/0272* (2013.01); *H04L 63/162* (2013.01); *H04L 63/306* (2013.01)

(58) Field of Classification Search
USPC ........ 709/217, 227, 228, 245; 370/315, 331, 370/352, 389, 432, 401, 469
See application file for complete search history.

(56) References Cited

U.S. PATENT DOCUMENTS

| | | |
|---|---|---|
| 2005/0086495 A1 | 4/2005 | Sheth et al. |
| 2006/0171365 A1* | 8/2006 | Borella .................. 370/338 |
| 2010/0309894 A1* | 12/2010 | Csaszar et al. ............ 370/338 |

FOREIGN PATENT DOCUMENTS

| | | |
|---|---|---|
| CN | 101005458 | 7/2007 |
| CN | 101141372 | 3/2008 |
| CN | 101217435 | 7/2008 |
| CN | 101854336 | 1/2010 |
| CN | 101707569 | 5/2010 |
| CN | 101977137 | 2/2011 |
| CN | 102111311 | 6/2011 |
| EP | 2031803 | 3/2009 |
| JP | 2010147687 | 7/2010 |

OTHER PUBLICATIONS

Extended European Search Report dated Jul. 25, 2014, EP Patent Application No. 11861700.00 dated Dec. 8, 2011, European Patent Office.

English Translation of CN Notice of Rejection dated Oct. 9, 2013 issued on CN Patent Application No. 201110066594.2 dated Mar. 18, 2011, The State Intellectual Property Office, P.R.China.

International Search Report and Written Opinion dated Mar. 15, 2012 issued on PCT Patent Application No. PCT/CN2011/083702 dated Dec. 8, 2011, The State Intellectual Property Office, the P.R. China.

CN First Office Action dated Oct. 9, 2012 issued on CN Patent Application No. 201110066594.2 filed on Mar. 18, 2011, The State Intellectual Property Office, P.R. China.

CN Second Office Action dated Apr. 16, 2013 issued on CN Patent Application No. 201110066594.2 filed on Mar. 18, 2011, The State Intellectual Property Office, P.R. China.

* cited by examiner

ACCESSING A PRIVATE NETWORK THROUGH L2TP

CLAIM FOR PRIORITY

The present application is a national stage filing under 35 U.S.C 371 of PCT application number PCT/CN2011/083702, having an international filing date of Dec. 8, 2011, which claims priority to Chinese Patent Application No. 201110066594.2, filed on Mar. 18, 2011, the disclosures of which are hereby incorporated by reference in their entireties.

BACKGROUND

Figure 1:
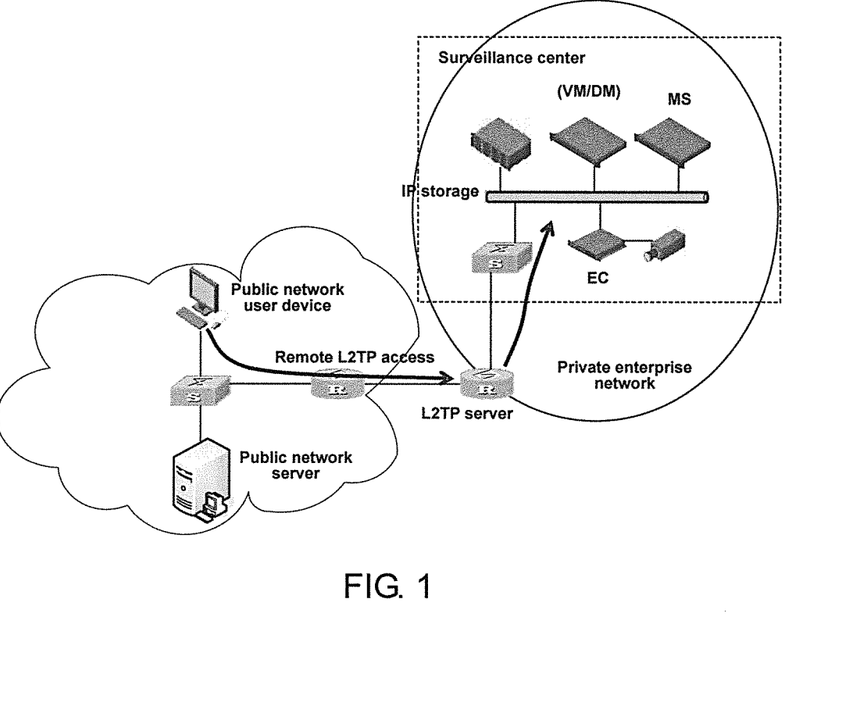
FIG. 1 is a schematic diagram illustrating a scenario of a public network user device accessing a private network in an existing L2TP network.

With the continuous development of networking and internet protocol (IP) techniques, intelligent surveillance techniques based on IP and networking have developed rapidly. In addition, IP surveillance has become a main surveillance technique. Due to security and cost, most surveillance networks are disposed in private networks. In these types of surveillance networks, a mobile user or a public network user, acting as a Video Client (VC), will dial into a private enterprise network through L2TP when they access surveillance resources in the private enterprise network, as shown in FIG. 1.

Figure 2:
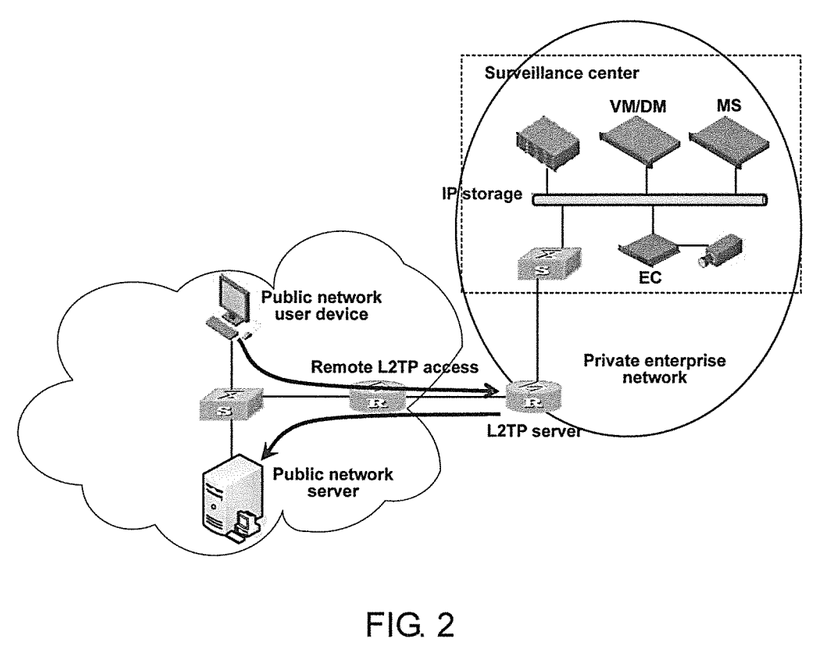
FIG. 2 is a schematic diagram illustrating a scenario of a public network user device accessing a public network in an existing L2TP network.

After the user dials into the private enterprise network, a default route with a high priority is added to a host of the user. The next-hop of the route is an L2TP interface of the host of the user. A result of this is that when the user visits other servers on the public network, packets will first be transmitted to the L2TP server, i.e., the export of the private enterprise network, before being forwarded to a public network server, as shown in FIG. 2. If there is an access restriction on the export of the private enterprise network or access to the public network is prohibited on the export of the private enterprise network, the public network user will be affected and bandwidth resources of the export of the private enterprise network are wasted.

DETAILED DESCRIPTION

Examples of the present disclosure provide a method, an L2TP server and a public network user device for accessing a private surveillance network through L2TP, so as to enable a public network user to visit the private surveillance network conveniently and without affecting access to the public network.

According to one aspect of the present disclosure, a method for accessing a private surveillance network through L2TP is provided, wherein a configuration, use default gateway on remote network, is cancelled on an L2TP virtual interface of a public network user device, the method includes:

receiving, by an L2TP server, an L2TP call initiated by the public network user device, assigning a private network IP address to the public network user device, and transmitting a route of a surveillance segment to the public network user device, such that, after receiving the route of the surveillance segment, configuring, by the public network user device, the IP address of the L2TP virtual interface as a next-hop of the route, and distributing the route to a routing table of the public network user device; when initiating an access request to a surveillance device in the private surveillance network, searching, by the public network user device, the routing table for a matching route of the surveillance segment according to an IP address of the surveillance device and transmitting the access request to the L2TP server through the L2TP virtual interface;

receiving, by the L2TP server, the access request and forwarding the access request to the surveillance device.

According to another aspect of the present disclosure, an L2TP server is provided. The L2TP server includes:

a memory; and a processor in communication with the memory; wherein the memory includes machine readable instructions executable by the processor, the machine readable instructions is:

to receive an L2TP call initiated by a public network user device, to assign a private network IP address to the public network user device and to transmit a route of a surveillance segment to the public network user device, wherein after the route is received by the public network user device, an IP address of an L2TP virtual interface of the public network user device is configured as a next-hop of the route and the route is distributed to a routing table of the public network user device, when an access request is initiated by the public network user device towards a surveillance device in a private network, the routing table is searched by the public network user device for a matching route according to an IP address of the surveillance device, and the access request is transmitted to the L2TP server via the L2TP virtual interface according to the next-hop of the matching route; and to receive the access request transmitted by the public network user device requesting to access the surveillance device, and to forward the access request to the surveillance device.

According to still another aspect of the present disclosure, a public network user device is provided. An L2TP virtual interface of the public network user device is not configured to "use default gateway on remote network". The public network user device includes:

a memory;

a routing table, to store a routing table; and a processor in communication with the memory; the memory comprising machine readable instructions executable by the processor; wherein the machine readable instructions is:

to receive a route of a surveillance segment transmitted by an L2TP server, configure an L2TP virtual interface of the public network user device as a next-hop of the route of the surveillance segment, and distribute the route of the surveillance segment to the routing table;

to search, when an access request is initiated to a surveillance device, the routing table for a matching route according to an IP address of the surveillance device, and transmit the access request to the L2TP server through the L2TP virtual interface according to a next-hop of the matching route.

Hereinafter, the present disclosure will be described in further detail with reference to the accompanying drawings and examples to make the technical solution and merits therein clearer.

Figure 3:
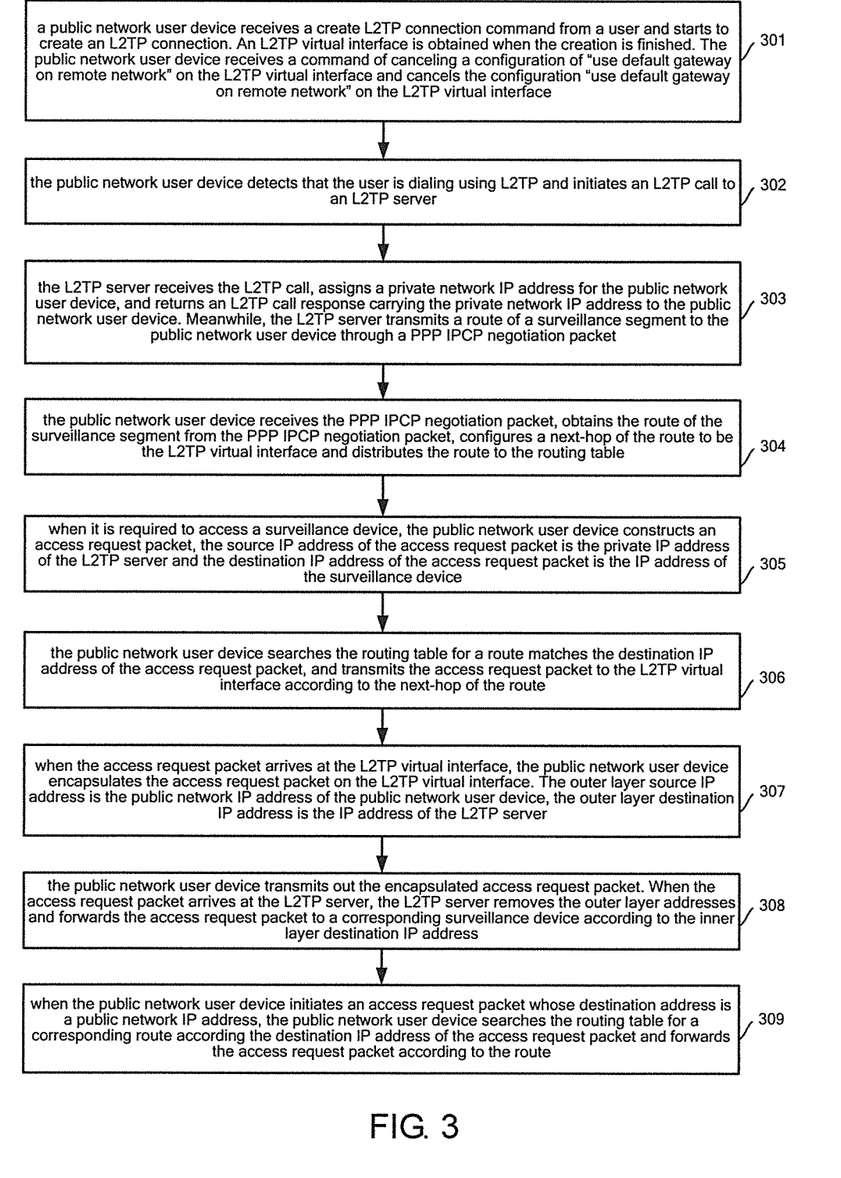
FIG. 3 is a flowchart illustrating a method for accessing a private surveillance network through L2TP according to an example of the present disclosure.

FIG. 3 is a flowchart illustrating a method for accessing a private surveillance network through L2TP according to an example of the present disclosure. As shown in FIG. 3, the method includes the following operations.

Block 301, a create L2TP connection command is received in a public network user device from a user and starts to create an L2TP connection. An L2TP virtual interface is obtained when the L2TP connection is created. Then the public network user device receives a command to cancel a configuration of "use default gateway on remote network" on the L2TP virtual interface and the configuration "use default gateway on remote network" on the L2TP virtual interface is canceled.

Block 302, the public network user device detects that the user is dialing using L2TP and initiates an L2TP call to an L2TP server.

Block 303, the L2TP server receives the L2TP call, assigns a private network IP address for the public network user device, and returns an L2TP call response carrying the private network IP address to the public network user device. Meanwhile, the L2TP server transmits a route of a surveillance segment to the public network user device through a PPP IPCP negotiation packet.

A network manager may configure the route of the surveillance on the L2TP server directly or the L2TP server may obtain the route of the surveillance from dynamic routes or static routes of the L2TP server itself. If the enterprise network includes multiple types of networks, e.g., surveillance network, office network, etc., the L2TP server may obtain the route of the surveillance segment through filtering all private network routes according to a routing policy. For example, if the surveillance segment is 192.168.0.0, the L2TP server searches a dynamic routing table and/or a static routing table for the route of this segment.

Herein, if the route of the surveillance segment is directly configured on the L2TP server by the network manager, the L2TP server directly carries the route of the surveillance segment in the PPP IPCP negotiation packet and transmits the PPP IPCP negotiation packet to the public network user device. If the route of the surveillance segment is obtained from the dynamic routes or static routes of the L2TP server, the L2TP server may obtain the route of the surveillance segment from the dynamic routes or static routes after receiving the L2TP call and then the route of the surveillance segment is carried in the PPP IPCP negotiation packet and the PPP IPCP negotiation packet is transmitted to the public network user device.

A format of the PPP IPCP negotiation packet in this block may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+--
|    Type     |    Length     |             Code                |
+-+-+-+-+-+-+-+-+-+-+-+-+-+-+-+-+-+-+-+-+-+-+-+-+-+-+-+-+-+-+-+--
|                         Network (1)                           |
+-+-+-+-+-+-+-+-+-+-+-+-+-+-+-+-+-+-+-+-+-+-+-+-+-+-+-+-+-+-+-+--
|                          MASK (1)                             |
+-+-+-+-+-+-+-+-+-+-+-+-+-+-+-+-+-+-+-+-+-+-+-+-+-+-+-+-+-+-+-+--
|                         Network (2)                           |
+-+-+-+-+-+-+-+-+-+-+-+-+-+-+-+-+-+-+-+-+-+-+-+-+-+-+-+-+-+-+-+--
|                          MASK (2)                             |
+-+-+-+-+-+-+-+-+-+-+-+-+-+-+-+-+-+-+-+-+-+-+-+-+-+-+-+-+-+-+-+--
|                          ............                         |
+-+-+-+-+-+-+-+-+-+-+-+-+-+-+-+-+-+-+-+-+-+-+-+-+-+-+-+-+-+-+-+--
```

The meaning and value of each field are as follows.

Type: indicates type of the packet. In this example, the value of this field may be 133, denoting that this packet is a surveillance segment route notification packet.

Length: indicates length of the packet.

Code: used for differentiating different functions of the packet. In this example, the meanings of different values are as follows:

0: update route. This is used by the L2TP server for periodically updating the route of the surveillance segment. After receiving this packet, the public network user device refreshes an aging time of a corresponding route;

1: add route. This is used for distributing the route when the public network user device comes online or the server adds a new route. After receiving this packet, the public network user device adds the route in this packet in a routing table.

2: delete route. This is used for notifying the public network user device after the server deletes a route. After receiving this packet, the public network user device deletes the route indicated by the packet.

Network: segment of the route.

Mask: mask length of the segment of the route.

When there are multiple surveillance segments, the routes of all the surveillance segments may be transmitted to the public network user device via the same PPP IPCP negotiation packet.

Certainly, the PPP IPCP negotiation packet is merely one example packet for carrying the route of the surveillance segment. In practical applications, other packets may also be adopted.

Block 304, the public network user device receives the PPP IPCP negotiation packet, obtains the route of the surveillance segment from the PPP IPCP negotiation packet, configures a next-hop of the route to be the L2TP virtual interface and distributes the route to the routing table.

Block 305, when it is to access a surveillance device, the public network user device constructs an access request packet. The source IP address of the access request packet is the private IP address of the L2TP server and the destination IP address of the access request packet is the IP address of the surveillance device.

Block 306, the public network user device searches the routing table for a route that matches the destination IP address of the access request packet, and transmits the access request packet to the L2TP virtual interface according to the next-hop of the route.

For instance, if the IP address of the surveillance device is 192.168.0.5, the matching route that the public network user device found in the routing table is a route of surveillance segment 192.168.0.0/24, the next-hop of the route is the L2TP virtual interface.

Block 307, when the access request packet arrives at the L2TP virtual interface, the public network user device encapsulates the access request packet on the L2TP virtual interface. The encapsulated outer layer source IP address is the public network IP address of the public network user device and the encapsulated outer layer destination IP address is the IP address of the L2TP server.

Block 308, the public network user device transmits out the encapsulated access request packet. When the access request packet arrives at the L2TP server, the L2TP server removes the outer layer addresses and forwards the access request packet to a corresponding surveillance device according to the inner layer destination IP address.

Block 309, when the public network user device initiates an access request packet whose destination address is a public network IP address, the public network user device searches the routing table for a corresponding route according the destination IP address of the access request packet and forwards the access request packet according to the route.

Since the public network user device is not configured to "use default gateway on remote network", after the public network user device visits the private network, the route of the private network will not be configured as a default route with high priority. Thus, subsequent access request packets directed toward the public network will be forwarded to the public network server directly according to a regular route searching procedure instead of being forwarded to the L2TP server firstly.

In this example, in block 304, when distributing the route of the surveillance segment to the routing table, the public network user device sets an aging time a for the route.

The L2TP server will transmit a PPP IPCP negotiation packet used for updating the route to the public network user device every other updating time b. The PPP IPCP negotiation packet carries updated route of the surveillance segment. After receiving the PPP IPCP negotiation packet, the public network user device resets the aging time of the corresponding route in the routing table according to the PPP IPCP negotiation packet, wherein b<a.

When the route reaches the aging time, the public network user device deletes the route.

When finding that a new route of a surveillance segment has been added, the L2TP server transmits a PPP IPCP negotiation packet carrying the newly-added route to the public network user device. After receiving the PPP IPCP negotiation packet, the public network user device takes the L2TP virtual interface as the next-hop of the route, distributes the route to the routing table and sets an aging time for the route.

When finding that the route of the surveillance segment has been deleted, the L2TP server transmits a PPP IPCP negotiation packet carrying the route being deleted to the public network user device. After receiving the PPP IPCP negotiation packet, the public network user device finds the route from the routing table and deletes the route.

In an example of the present disclosure, when the L2TP server transmits the PPP IPCP negotiation packet, it is possible to set a response timer. When receiving the PPP IPCP negotiation packet, the public network user device returns a PPP IPCP acknowledgement to the L2TP server. If the L2TP does not receive the PPP IPCP acknowledgement from the public network user device before the timer expires, the L2TP server retransmits the PPP IPCP negotiation packet to the public network user device.

Figure 4:
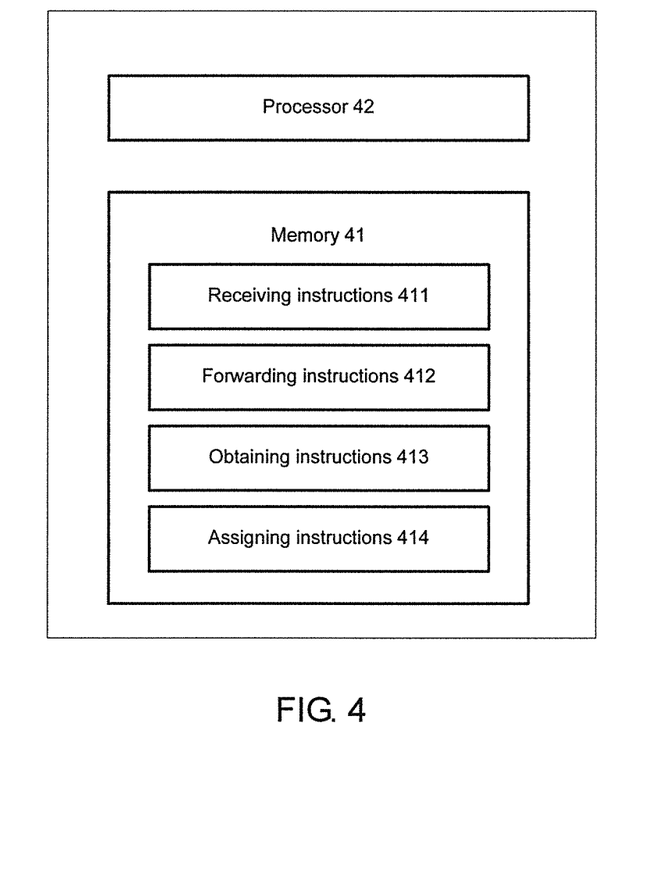
FIG. 4 is a block diagram illustrating a structure of an L2TP server according to an example of the present disclosure.

FIG. 4 is a block diagram illustrating a structure of an L2TP server according to an example of the present disclosure. As shown in FIG. 4, the L2TP server includes: a memory 41 and a processor 42 in communication with the memory 41. The memory 41 may be a computer readable storage media including machine readable instructions. The processor 42 may execute the stored machine readable instructions.

The memory 41 includes receiving instructions 411, forwarding instructions 412, obtaining instructions 413 and assigning instructions 414.

The receiving instructions 411 may be executed to receive an L2TP call initiated by a public network user device.

The forwarding instructions 412 may be executed to receive an access request transmitted by the public network user device requesting to access a surveillance device, and to forward the access request to the surveillance device.

The obtaining instructions 413 may be executed to obtain the route of the surveillance segment configured by a network manager on the L2TP server, or to filter dynamic routes or static routes of the L2TP server to obtain the route of the surveillance segment.

The assigning instructions 414 may be executed to transmit the route of the surveillance segment obtained by the obtaining instructions 413 to the public network user device.

The memory 41 may further include instructions executed to distribute the newest route of the surveillance segment to the public network user device every other updating time period, or to transmit, when finding a new route of the surveillance segment, the new route to the public network user device, or to transmit, when finding that a route of the surveillance segment has been deleted, a route deleting packet carrying the route being deleted to the public network user device.

Figure 5:
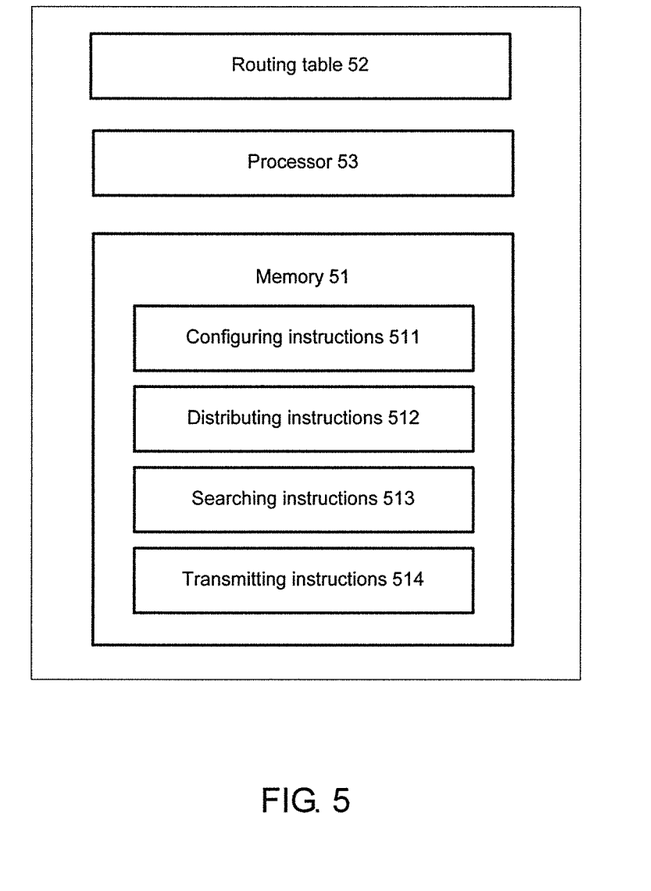
FIG. 5 is a block diagram illustrating a structure of a public network user device according to an example of the present disclosure.

FIG. 5 is a block diagram illustrating a public network user device according to an example of the present disclosure. The public network user device is not configured to "use default gateway on remote network". As shown in FIG. 5, the public network user device includes: a memory 51, a routing table 52 and a processor 53 in communication with the memory 51. The memory 51 may be a computer readable storage media including machine readable instructions. The processor 53 may execute the stored machine readable instructions.

The routing table 52 is to store a routing table.

The memory 51 includes configuring instructions 511, distributing instructions 512, searching instructions 513 and transmitting instructions 514.

The configuring instructions 511 may be executed to receive a route of a surveillance segment transmitted by an L2TP server, and to configure an L2TP virtual interface of the public network user device as a next-hop of the route of the surveillance segment.

The distributing instructions 512 may be executed to distribute the route of the surveillance segment to the routing table 52.

The searching instructions 513 may be executed to search, when an access request is initiated to a surveillance device, the routing table 52 for a matching route according to an IP address of the surveillance device.

The transmitting instructions 514 may be executed to transmit the access request to the L2TP server through the L2TP virtual interface according to the next-hop of the matching route.

The memory 51 may further include instructions executed to set an aging time for the route of the surveillance segment when the route of the surveillance segment is distributed to the routing table, to reset the aging time of the route of the surveillance segment when an updated route of the surveillance segment distributed by the L2TP server is received, and to delete the route of the surveillance segment when a route deleting packet is received from the L2TP server.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for accessing a private network through Layer 2 Tunnel Protocol (L2TP), comprising:
   receiving, by an L2TP server, an L2TP call initiated by a public network user device;
   assigning, by the L2TP server, a private network IP address to the public network user device;
   transmitting, by the L2TP server, a route of a segment to the public network user device, wherein:
      after receiving the route of the segment, the public network user device configures an IP address of an L2TP virtual interface of the public network user device as a next-hop of the route and distributes the route to a routing table of the public network user device; and
      when initiating an access request by the public network user device to a device in the private network, the public network user device searches the routing table for a matching route of the segment according to an IP address of the device and transmits the access request to the L2TP server through the L2TP virtual interface; and
   receiving, by the L2TP server, the access request and forwarding the access request to the device.

2. The method of claim 1, wherein transmitting, by the L2TP server, the route of the segment to the public network user device further comprises:
   transmitting, by the L2TP server, the route of the segment configured by a network manager on the L2TP server to the public network user device; or
   filtering, by the L2TP server, dynamic routes or static routes of the L2TP server to obtain the route of the segment and transmitting the route of the segment to the public network user device.

3. The method of claim 1, further comprising:
   when transmitting the route of the segment to the public network user device, setting, by the L2TP server, a response timer; and
   if the L2TP server does not receive an acknowledgment from the public network user device before the response timer expires, retransmitting, by the L2TP server, the route of the segment to the public network user device.

4. The method of claim 1, further comprising:
   after the L2TP server transmits the route of the segment to the public network user device, the L2TP server distributes a newest route of the segment to the public network user device at every other updating time periods, wherein distribute the route to the routing table of the public network user device further comprises:
      setting, by the public network user device, an aging time for the route of the segment; and
      after receiving the newest route of the segment, resetting, by the public network user device, the aging time of the route.

5. The method of claim 1, further comprising:
   after transmitting, by the L2TP server, the route of the segment to the public network user device, when the L2TP server finds a new route of the segment, transmitting, by the L2TP server, the new route to the public network user device, wherein:
      after receiving the new route, the public network user device takes the L2TP virtual interface as a next-hop of the new route; and
      the public network user device distributes the new route to the routing table; or
   when the L2TP server finds that the route of the segment is deleted, transmitting a route delete packet carrying the route being deleted to the public network user device, wherein after receiving the route delete packet, the public network user device deleting the route.

6. A hardware Layer 2 Tunnel Protocol (L2TP) server, comprising:
   a memory; and
   a processor in communication with the memory; wherein the memory stores machine readable instructions executable by the processor, the machine readable instructions comprise instructions to:
      receive an L2TP call, initiated by a public network user device, to assign a private network IP address to the public network user device and to transmit a route of a segment to the public network user device, wherein:
         after the route is received by the public network user device, an IP address of an L2TP virtual interface of the public network user device is configured as a next-hop of the route and the route is distributed to a routing table of the public network user device; and
         when an access request is initiated by the public network user device towards a device in a private network, the routing table is searched by the public network user device for a matching route according to an IP address of the device, and the access request is transmitted to the hardware L2TP server via the L2TP virtual interface according to the next-hop of the matching route;
      receive the access request transmitted by the public network user device requesting to access the device; and
      forward the access request to the device.

7. The hardware L2TP server of claim 6, wherein the memory further comprises machine readable instructions executed to:
   obtain the route of the segment configured by a network manager on the hardware L2TP server to the assigning module; or filter dynamic routes or static routes of the hardware L2TP server to obtain the route of the segment and transmit the route of the segment to the public network user device.

8. The hardware L2TP server of claim 6, wherein the memory further comprises machine readable instructions executed to:
distribute a newest route of the segment to the public network user device every updating time period; or
transmit, when a new route of the segment is found, the new route to the public network user device; or
transmit, when the route of the segment is deleted, a route deleting packet carrying the route being deleted to the public network user device.

9. A public network user device, wherein the public network user device is not configured to use default gateway on a remote network, comprising:
a memory;
a routing table; and
a processor in communication with the memory; the memory storing machine readable instructions executable by the processor; wherein machine readable instructions comprise instructions to:
receive a route of a segment transmitted by an L2TP server, configure an L2TP virtual interface of the public network user device as a next-hop of the route of the segment, and distribute the route of the segment to the routing table;
search, when an access request is initiated to a device, the routing table for a matching route according to an IP address of the device, and transmit the access request to the L2TP server through the L2TP virtual interface according to a next-hop of the matching route.

10. The public network user device of claim 9, wherein the memory further comprises machine readable instructions executed to:
set an aging time for the route when the route of the segment is distributed to the routing table;
reset the aging time of the route when an updated route of the segment distributed by the L2TP server is received; and
delete the route when a route deleting packet is received from the L2TP server.

* * * * *